C. E. JOHNSON.
AUTOMATIC RING HANDLING MACHINE.
APPLICATION FILED OCT. 11, 1915.

1,190,553.

Patented July 11, 1916.
5 SHEETS—SHEET 1.

Fig. 1.

Inventor
Charles E. Johnson
By Moulton & Lawrence
Attorneys.

C. E. JOHNSON.
AUTOMATIC RING HANDLING MACHINE.
APPLICATION FILED OCT. 11, 1915.

1,190,553.

Patented July 11, 1916.
5 SHEETS—SHEET 2.

Inventor
Charles E. Johnson
By Moulton & Livrance
Attorneys.

UNITED STATES PATENT OFFICE.

CHARLES E. JOHNSON, OF MUSKEGON, MICHIGAN.

AUTOMATIC RING-HANDLING MACHINE.

1,190,553.　　　　　　　Specification of Letters Patent.　　Patented July 11, 1916.

Application filed October 11, 1915. Serial No. 55,302.

*To all whom it may concern:*

Be it known that I, CHARLES E. JOHNSON, a citizen of the United States of America, residing at Muskegon, in the county of Muskegon and State of Michigan, have invented certain new and useful Improvements in Automatic Ring-Handling Machines; and I do hereby declare the following to be a full, clear, and exact description of the invention, such as will enable others skilled in the art to which it appertains to make and use the same.

This invention relates to an automatic ring handling machine adapted especially to handle piston ring castings one at a time and machine both sides thereof so that each ring casting may be cut to a predetermined thickness with both sides machined to a true plane and parallel to each other.

It is the object and purpose of my invention to provide a mechanism of this character in which a large number or group of rough ring castings may be placed and which will take the rings one at a time from the group, place it and properly position it on a holding chuck, machine it on both sides to the required degree of accuracy and then eject the ring from the chuck, this operation being indefinitely repeated with each ring so long as a supply of rings is furnished. To this end I have embodied my invention in a mechanism which contains many new and useful features of construction and operation enabling the hereinbefore described process to be carried out satisfactorily; and these novel features of construction, operation and function will appear as understanding is had of the construction shown in the accompanying drawings, in which;

Fig. 10 is a plan view of that part of the machine adjacent the expanding clutch and including the tool holder and ejecting device. Fig. 11 is a view looking toward the expanding clutch, adjacent parts of the mechanism being shown in section and illustrating the means for operating the cutting tools back and forth toward the rings. Figs. 12 and 13 are plan and side elevations respectively of one element; and Figs. 14 and 15 are side elevation and underneath plan views respectively of another associated element for controlling the ejecting mechanism.

Like reference characters refer to like parts throughout the several views of the drawings.

The machine as a whole bears some resemblance to a metal working lathe and includes a bed 1 supported at the ends by upright standards 2 and 3. At one end of the bed a head 4 is placed comprising a base with spaced apart upright extensions which at their upper ends terminate in bearings 5 in which a hollow shaft 6 is mounted. This shaft has mounted thereon a cone pulley 7 of different sizes and associated with this mechanism is the ordinary back gearing of a lathe including gears within the casings 8 and 9 connected by a shaft 10 and controlled by the handle 11. This structure so far as described is a usual and ordinary structure for driving lathes in practically all respects.

A pinion 12 mounted on the shaft 6, through a plurality of gears and pinions 13, drives a large gear 13ª secured on a shaft 14 which extends the full length of the lower part of the bed 1 and at the opposite end of the bed has a large drum 15 secured thereto. Shaft 14 rotates very slowly compared to the rotation of shaft 6.

Figure 1:
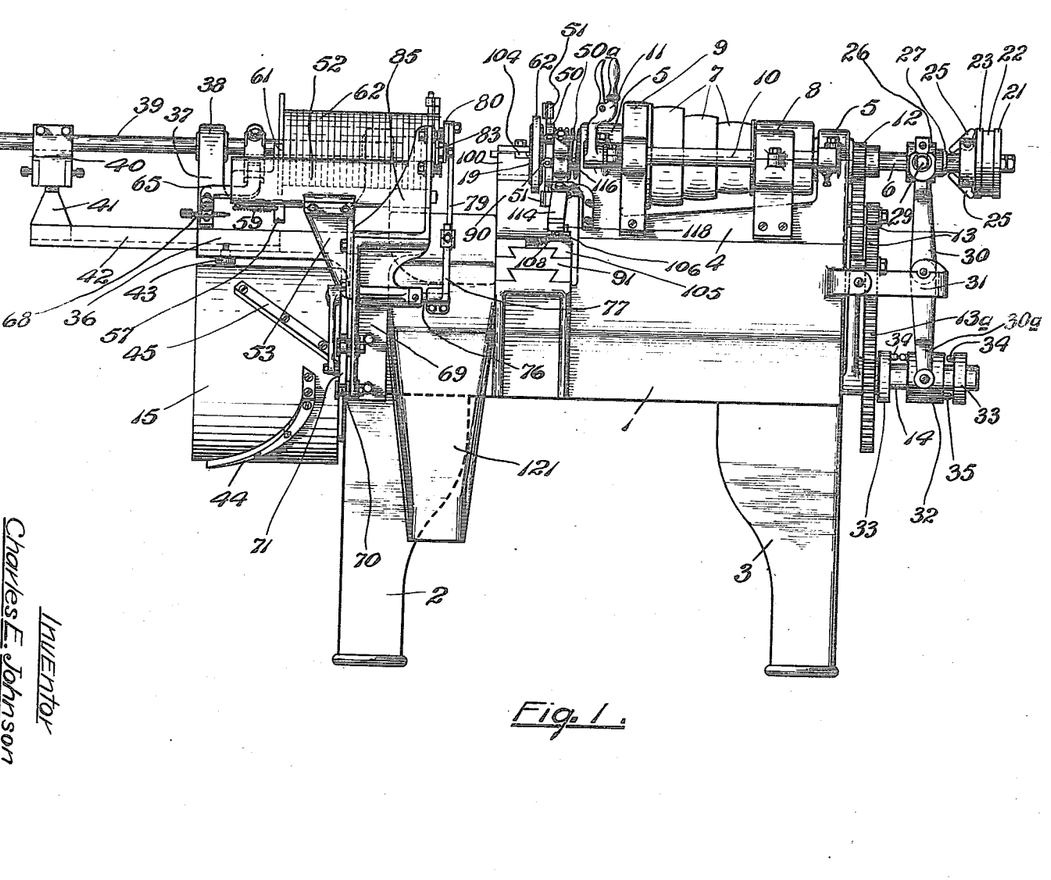
Figure 1 is a rear elevation of the ring handling machine.
Figures 2, 3, 4:
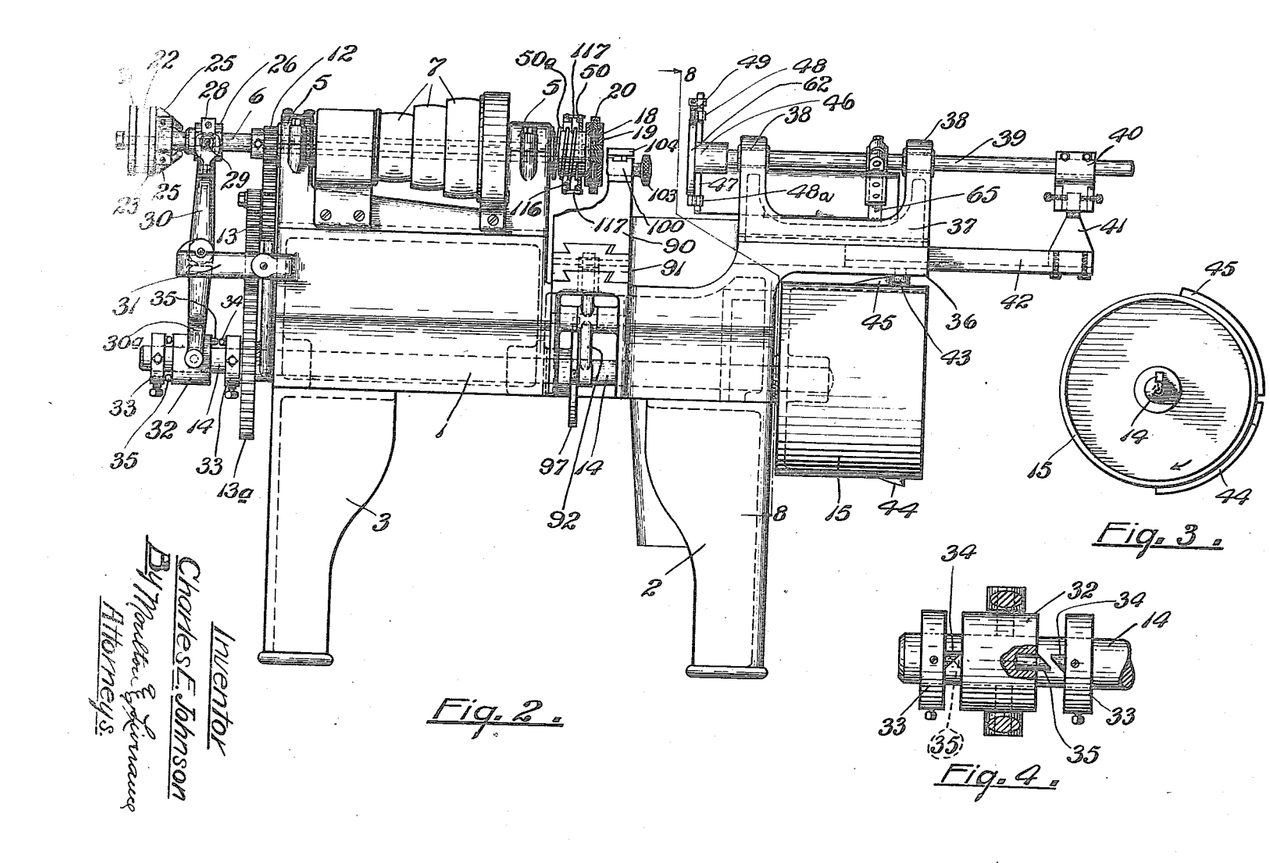
Fig. 2 is a front elevation thereof.
Fig. 3 is an end view of a cam drum forming one element of the machine.
Fig. 4 is an enlarged plan view with parts shown in section of a detail of the mechanism for expanding the ring holding clutch.
Figure 7:
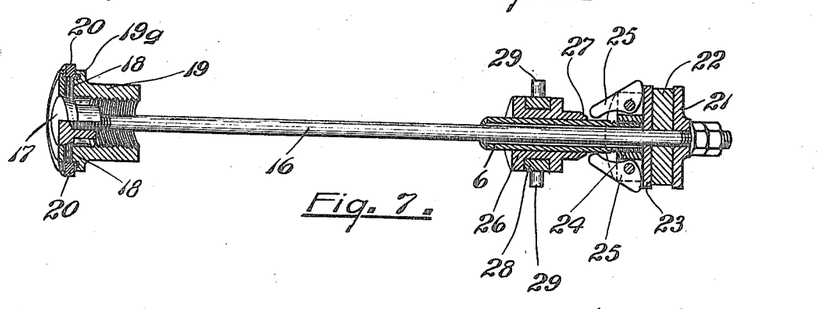
Fig. 7 is a section taken through the expanding clutch and the mechanism for operating the same.

A rod 16 is inserted through the hollow shaft 6, one end having a tapered head 17 which is located so that its inclined edges bear against the ends of pins 18 radially positioned and loosely seated in a clutch head 19 which may be detachably connected to the end of shaft 6. The outer ends of pins 18 bear against movable clutch members 20 which are seated in T-shaped slots formed in an enlargement 19ª of the head 19. It is evident that when rod 16 is carried to the right (see Fig. 7), pins 18 are forced outwardly, expanding the clutch members 20 and increasing the circumference thereof so that a ring positioned over said members is gripped and held by the expansion of the clutch. At its opposite end rod 16 carries a disk 21 against the inner side of which bears a friction disk 22, it in turn being in contact with a disk 23. A collar 26 is loosely mounted on shaft 6 and at the end adjacent levers 25 is tapered as shown at 27 permitting the collar to engage underneath the levers and force their free ends away from shaft 6, forcing disks 21, 22 and 23 away from collar 24 and the head 17 against the pins 18 to expand the clutch. Collar 26 has an annular groove in which is seated a ring 28 from which project diametrically opposed pins 29. A lever 30 pivotally mounted between its ends to a bracket 31 secured to the bed 1 has a forked upper end, the legs of which connect with the pins 29. At its lower end lever 30 is forked as shown at 30ª, the legs passing to either side of and connecting with a collar 32 which is loosely mounted upon shaft 14. At each side of collar 32 a collar 33 is fixed to shaft 14, each collar carrying a pin 34, the end of which projects toward collar 32 and is cut at an angle as best shown in Fig. 4. Collar 32 is provided with two pins 35 of similar shape which are positioned on opposite sides of the collar and at diametrically opposed points. Pins 35 are mounted so as to turn in the collar 32 whereby with the rotation of shaft 14 and engagement of a pin 34 with a pin 35 full contact of the inclined faces of the pins will be secured so long as they are in engagement with each other. With the parts in the position shown in Figs. 1 and 2, the clutch is not expanded but with the rotation of shaft 14, outer collar 33 brings its pin 34 into contact with the pin 35 on collar 32 forcing collar 32 inwardly toward the machine and carrying rod 6 outwardly to expand the clutch. The expansion holds until the inner collar 33 has moved to such position that its pin 34 contacts with the other pin 35 on collar 32 whereupon the parts again occupy the position shown in Figs. 1 and 2 with the clutch unexpanded.

At the end of the bed opposite the drive mechanism an extension 36 is provided above which is mounted a U-shaped support 37 having spaced apart legs terminating in bearings 38 in which a rod 39 is slidably mounted. At its outer end rod 39 carries a member 40 which connects with a member 41 secured to a channel shaped bar 42 extending into the extension 36 and having slidable movement back and forth in a passageway therein. A roller 43 is mounted on and below the bar 42 immediately above the drum 15 on which are secured cam bars 44 and 45 of the formation best shown in Fig. 1. These bars are so positioned and located that as the drum rotates bar 44 engaging with roller 43 causes the roller and bar 42 to move inwardly, rod 39 moving in unison therewith. This will take place until the roller contacts with the bar 45 whereupon an opposite movement will be imparted to the roller and attached members. At the inner end of rod 39 a head 46 is secured from which a plurality of short bars 47 project radially. On certain of the bars 47 a block 48 is mounted, the surfaces of which are in substantially the same vertical plane while on others of the bars blocks 48ª are secured having projections extending in front of the plane of the surfaces of the other members 48. Blocks 48 and 48ª are adjustably mounted on the bars 47 to provide for rings of different sizes. One bar 47 extends upwardly a distance above the head 46 and on it is mounted a spring 49. The head is adapted to carry a ring casting which contacts with the projections on blocks 48ª and is held by the spring 49 on the face of the head 46. For convenience, the structure consisting of rod 49, head 46 and attached parts, bar 42 and the connections 40 and 41 may be denoted as a ram, the head of which carries the rings one at a time to the expanding clutch heretofore described, the design being such that when the inward movement of the ram has reached its limit a ring carried by the head 46 will be positioned around the expanding members 20 of the clutch and just previous to the expansion thereof. Back of the head 19 is mounted a ring 50 from which projects a plurality of bars similar to the bars 47, each being equipped with an adjustable block 51, the surfaces of which lie in the same vertical plane. The ring 50 is normally forced against the enlargement 19ª by a strong compression spring 50ª. As the ram moves toward the clutch carrying a ring with it one side of the ring strikes against the members 51 being properly alined thereby. The spring 50ª resists the movement of the ram but is not of sufficient strength to overcome it and after the ring has been positioned over the clutch and before the ram returns to the position shown in Figs. 1 and 2 the clutch will have been expanded as previously described to engage with the inner surface of the ring and hold it firmly on the clutch.

Figures 5, 6:
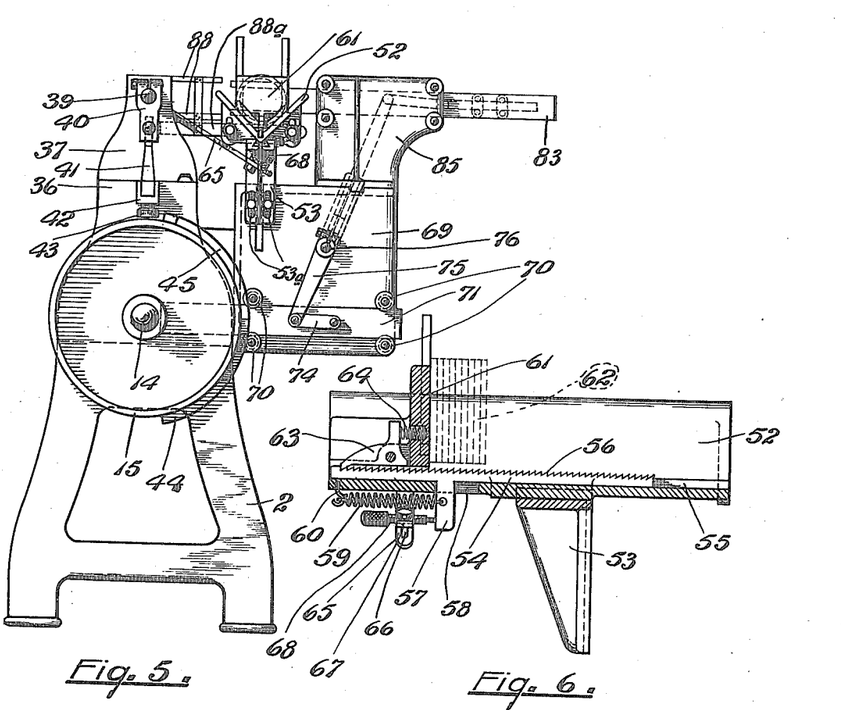
Fig. 5 is an end elevation of the machine.
Fig. 6 is a longitudinal vertical section through the ring holding hopper.
Figures 8, 9:
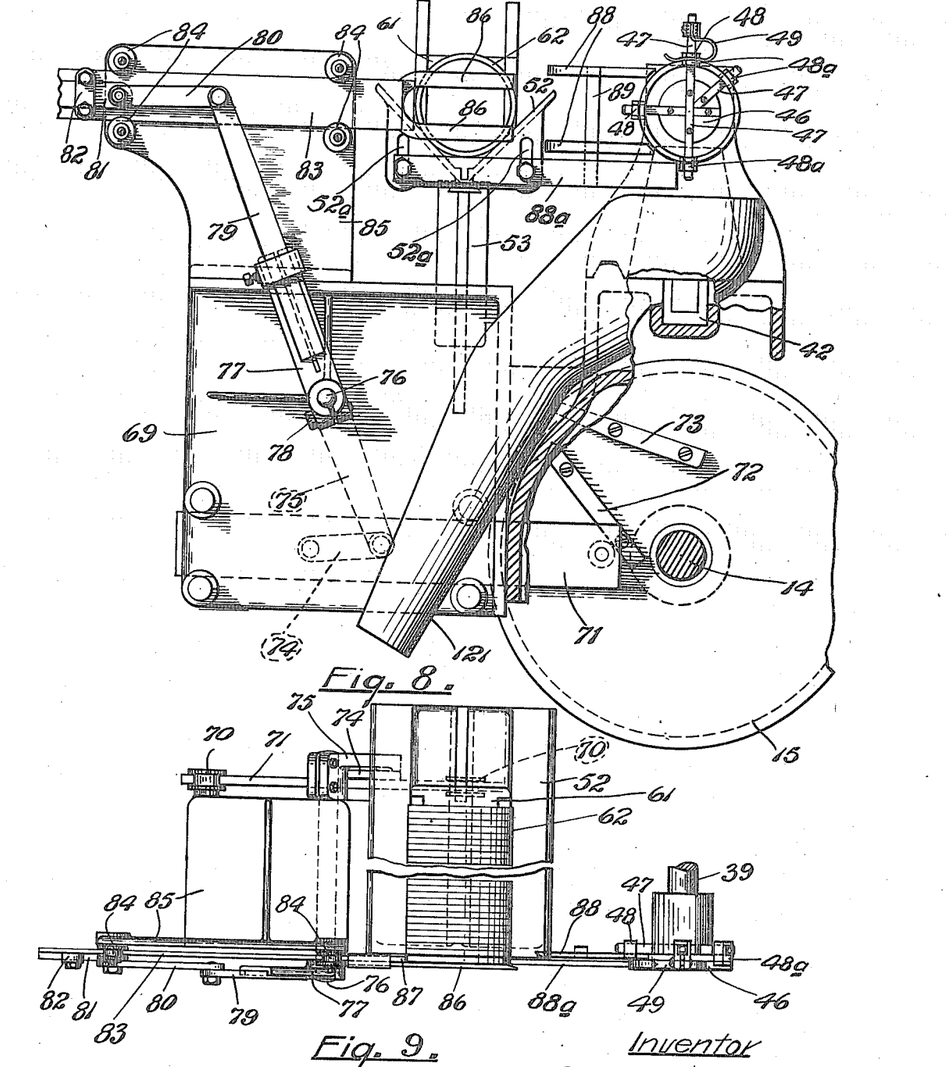
Fig. 8 is a view taken substantially on the line 8—8 of Fig. 2 and looking in the direction indicated by the arrows.
Fig. 9 is a plan view of the hopper and associated mechanism for taking one ring at a time therefrom and carrying it to the head of the ram.

Back of head 46 of the ram is positioned a trough-like hopper 52 which is supported by a bracket 53 attached beneath the hopper. A bar 54 is located in a slot 55 in the bottom of the trough and its upper edge is provided with a plurality of ratchet teeth 56 as shown in Fig. 6. This bar also has a projection 57 extending downwardly through a short slot 58 in the hopper to which is attached one end of a coil spring 59, the other end of the spring engaging with a hook 60 fastened to the underside of the hopper. A block 61 is loosely mounted in the hopper in front of which the rings 62 are placed, said block at its rear lower edge carrying a pivotally mounted pawl 63 which engages with the teeth 56 of bar 54 and is held in engagement by a spring 64. A bar 65 adjustably mounted on the rod 39 has its end positioned to come back of the projection 57. The end of bar 65 is slotted as shown at 66, in which slot is adjustably mounted a block 67 carrying an adjusting screw 68 which may be manually adjusted to any desired position. In practice the bar 65 is positioned on rod 49 so that on forward movement of the ram, the last part of the movement will bring the end of screw 68 into engagement with projection 57, in this manner sliding bar 54 a short distance. In consequence of the movement of bar 54 the block 61 is moved therewith forcing the ring castings 62 ahead of it, as will be understood. On return movement of the ram the spring 59 draws bar 54 back to its normal position, notches 56 riding underneath the pawl 63 and block 61 remaining in the position to which it had been operated. It will be clear therefore that with each reciprocation of the ram the block 61 is moved forward a certain number of notches depending upon the adjustment given by the adjusting screw 68 and the rings in front of the block are correspondingly moved. A bracket support 69 is connected to the end of the bed 1 below the hopper 52 and it is to this bracket that the bracket 53 is secured, slots 53$^a$ being formed in bracket 53 to permit an adjustment of the hopper with respect to the stationary parts of the machine for rings of different diameters. Adjacent its lower edge, at one side bracket 69 carries a plurality of pairs of rollers 70 serving to slidably retain and guide a bar 71, the end of which passes behind drum 15 and carries a roller shown in dotted outline in Fig. 8 which is engaged by the sides of strips 72 and 73 formed in the end of the drum so that with each revolution of the drum bar 71 is moved back and forth once. A link 74 is pivotally connected at one end to the bar 71 being pivotally connected at its other end to the lower end of the lever 75 fixed on a shaft 76 which is mounted in the bracket 69. At its opposite end shaft 76 has a lever 77 secured thereto, this lever being connected by means of the bolt 78 which, when desired, may be loosened to release the lever from the shaft. An extension 79 is adjustably connected to the lever 77, its upper end having pivotal connection to a link 80 which in turn is pivotally connected to a bar 81 adjustably secured by means of clips 82 to the horizontal bar 83 slidably mounted between pairs of rollers 84 mounted on a bracket 85 which rests upon the bracket 69 heretofore described. At its forward end bar 83 carries a fork having upper and lower legs 86 which are adapted to pass immediately in front of the forward ring in the hopper 52, the end 87 of bar 83 forming a shoulder which engages directly back of the ring so that with each rotation of the drum and consequent forward movement of bar 83, a ring is taken from the hopper and is pushed forward by bar 87 beyond the limits of the hopper being guided by the legs 86 and the auxiliary guides 88 which are supported in spaced apart relation by the vertical support 89 to the end 46 of the ram, the lower edge of the ring riding on a bar 88$^a$ which is adjustably mounted by the pin and slot connection shown at 52$^a$ at the forward end of the hopper. In this manner with each revolution of the cam 15 a ring is taken from the plurality of rings placed in the hopper and is carried forward to and inserted between the projections of members 48$^a$ and the spring 49 on the head 46 of the ram, the ram at such time being at rest and in the position indicated in Figs. 1 and 2. And by reason of the adjustability of the various parts described rings of any size within limits may be handled.

A support 90 is secured to a slide 91 mounted to move back and forth transversely of the bed 1. A lever 92 pivoted between its ends on a short shaft 93 has an upper forked end 94 engaging with a pin 95 on the slide 91, its lower end carrying a roller 96 which contacts with the outer surface of a cam 97 fastened to the shaft 14. In the position shown in Fig. 11 the slide has been carried to the rearmost limits of its travel and the roller 96 is about to be engaged by the member 98 secured to the cam 97 to quickly operate roller 96 into the depression 99 and thereby carry the slide with a quick return to the other limit of its travel. With the continued rotation of the cam 97 the slide remains at rest for a period after roller 96 has entered recess 99, the surface of cam 97 for a distance being concentric with the shaft 14 but thereafter the slide is carried to the rear as the surface of the cam progressively increases its radius. At the upper end of the support 90 tool holders 100 are adjustably mounted on the rib 101. These tool holders may be adjusted with respect to each other by means of the screw 102 operated by the head 103 to change the distance between them or they may be adjusted together with respect to the support 90. Each tool holder carries a tool 104, the cutting ends of which are spaced a distance apart equal to the desired thickness of a ring. The tools are so located with respect to a ring casting 62 held on the expanding clutch that with the rearward movement of a slide 91 both sides of the ring are simultaneously cut and machined and when the slide is retracted as the roller 96 is carried to the depression 99 the ring casting is finished so far as the machining of its sides is concerned.

Figures 10, 12:
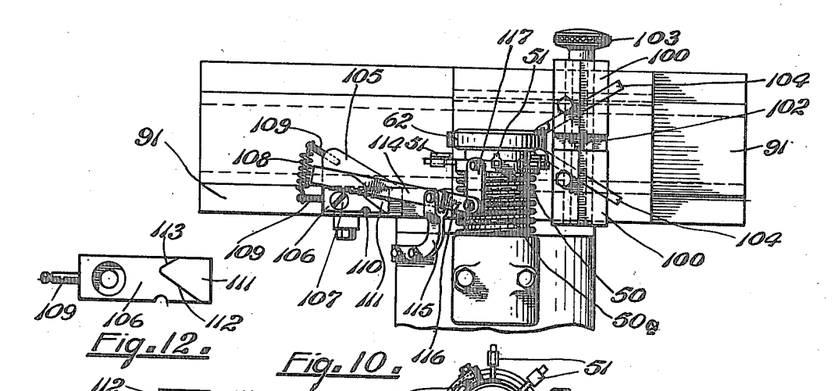
Figures 11, 13, 14, 15:
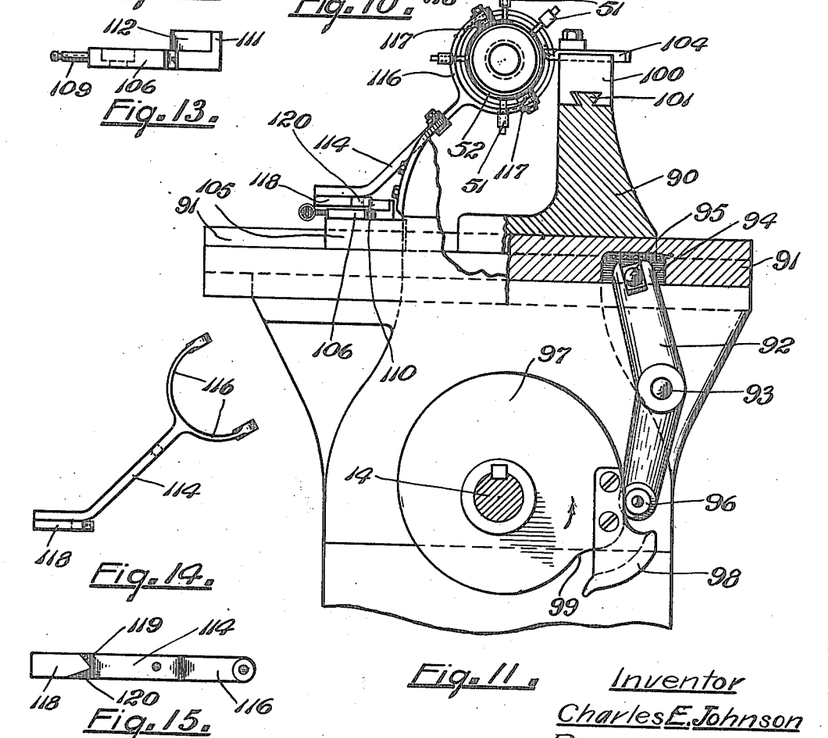

A block 105 is attached to the slide 91 as shown in Figs. 10 and 11 on which is pivotally mounted a member 106 at 107, a coil spring 108 under tension being interposed between pins 109 extending to the rear from block 105 and member 106 to force the member 106 against a pin 110 projecting upwardly from block 105 as shown. At its forward end the member 106 is provided with an upward projection 111 which has inclined sides 112 and 113 making the projection 111 pointed at its rear end. A member 114 is pivotally carried by a bracket 115, its upper end being forked to provide legs 116 which pass above and below the spring 50ª, link connections 117 being interposed between the ends of legs 116 and the ring 50. The lower end of member 114 is turned so as to lie above the block 105 and on its underside the lower end of member 114 carries a member 118 which is pointed at its forward end having inclined sides 119 and 120 as shown in Fig. 15.

When a ring is placed by the ram over the expanding clutch it is forced against the members 51 and ring 50 is moved against the resistance of spring 50ª. It is necessary that the ring 50 be moved away from the ring casting 62 operated upon to provide clearance for one of the tools 104 and to relieve the pressure exerted by the spring 50ª. Accordingly as slide 91 moves to the rear or, referring to Fig. 10 to the left, inclined side 117 engaging with the inclined side 119 of member 118 turns member 114 about its pivot and draws ring 50 with its attached devices 51 away from the ring casting 62. With the quick return of the slide to its forward position, projection 111 moves away from the member 118 quickly releasing the member 114 which, acted upon by the spring 50ª, returns quickly to position, the ring 50 with its attached devices 51 striking with considerable force against the ring casting 62 that has been machined and forcing it from the clutch, it being understood that the clutch has been released by the inner collar and pin 33 and 34 just previous to the striking of ring casting 62 by members 51. The casting, accordingly, is forced from the clutch and ejected into the chute 121 which may lead to any suitable receptacle. Whenever a casting 62 is put on the clutch the member 114 is moved sufficiently to cause projection 111 to engage with its side 113 against the side 119 of member 118 as the slide moves to the rear but if at any time through lack of supply of rings in the hopper or any other cause a casting 62 should not be placed on the clutch, the member 50 will extend far enough over the clutch that with rearward movement of slide 91 the side 112 of projection 111 engages against side 120 of member 118, and it is for this reason that the part 106 is pivotally mounted and yieldingly held by the spring 108, there being no danger of any breakage occurring in the event of failure to supply rings 62 to the expanding clutch.

From the foregoing it will be apparent that I have provided a machine which will automatically handle any machine ring castings without attention other than supplying the rings in proper number to the receiving hopper; that with each cycle of the machine a ring will be taken from the hopper carried to the ram and thereafter carried by the ram to the expanding clutch which is timed to expand through proper mechanism just after the ring is placed over the clutch; that this expansion of the clutch will be maintained while the ring is being machined, a tool holder driven by mechanism and having tools therein being located adjacent the clutch and automatically operated to machine both sides of the ring and thereafter quickly retracted from the ring immediately before the expanding clutch is released; and that in conjunction with the ram for placing the ring casting on the expanding clutch is an alining device for properly alining each casting for action by the cutting tools working by means of spring pressure which is automatically removed from the casting as soon as the cutting tools begin to act and held until the tools have been moved from the casting, being then released immediately after the release of the expanding clutch serving to eject the ring from the clutch into any proper receptacle.

Various modifications in detail of structure may be resorted to without departing from the invention which is defined in the appended claims and all modifications falling within the scope of said claims are to be considered as comprehended by my invention.

I claim:

1. In a mechanism of the character described, a ring receiving hopper, a ram having a head, means to carry a ring from the hopper to the head, means on the head to receive the ring, an expanding clutch, means to operate the ram to carry the ring on the head thereof to the clutch, means to expand the clutch after the ring is placed thereover, a tool holder, tools mounted thereon, means to move the tool holder toward the ring, means for rotating the clutch and ring thereon, means for retracting the tool holder, an ejecting mechanism mounted adjacent the clutch, means for operating the ejecting mechanism for striking the ring after the tool holder has been retracted and means to release the clutch previous to the action of the ejecting mechanism.

2. In combination, a ring receiving hopper adapted to contain a plurality of rings, a support therefor, a ram slidably mounted on the support, a shaft rotatively mounted on the support, means to rotate the shaft, a drum on the shaft, cam bars on the drum engaging with the ram for moving it back and forth on the support, a head on the arm, means operated by the drum for taking a ring from the hopper and transferring it to the head, means on the ram for forcing the rings forward step by step with each reciprocation of the ram, an expanding clutch rotatively mounted on the support adapted to receive the ring from the head, means to expand and release the clutch with an interval of time between, means automatically operated by the shaft for machining the ring during said interval of time, and means to eject the ring from the clutch after release thereof.

3. In combination, a supporting bed, a shaft extending lengthwise of the bed, a drum on one end of the shaft, a ram slidably mounted above the drum, means interposed between the ram and drum for moving the ram back and forth once with each rotation of the shaft, an expanding clutch located in front of the head of the ram, means to rotate the clutch, means to expand and release the clutch with each revolution of the shaft with an interval of time between expansion and release, a ring holding hopper, means operated by the drum for taking a ring therefrom and transferring it to the head of the ram with each revolution of the drum previous to the movement of the ram toward the clutch, means for machining the sides of the ring during the time between expansion and release of the clutch, a spring operated ejecting mechanism located adjacent the clutch, means to move said mechanism away from the clutch against the spring while the ring is being operated upon, and means to release the ejecting mechanism after the operation on the ring is completed to thereby eject the ring from the clutch.

4. In combination, an expanding clutch, means to support the clutch, means to rotatively drive the clutch, means to expand and release the clutch, means to periodically position a ring over the clutch immediately before expansion thereof, means to machine the ring before release of the clutch, and means to eject the ring from the clutch immediately after release thereof, substantially as described.

5. In combination, an expanding clutch, a hollow shaft on which the clutch is detachably secured, means to support the shaft, means to drive the shaft, a second shaft located below the hollow shaft, reduction gearing between the shafts for driving the second shaft at a comparatively low rate of speed, a rod extending through the hollow shaft and connected with a tapered head forming part of the clutch, a lever pivotally mounted between its ends, a collar loosely mounted on the lower shaft, pins projecting from opposite sides of the collar, a connection between said collar and the lower end of the lever, a collar on the lower shaft at each side of the loose collar, a pin on each collar extending toward the loose collar, a collar on the upper shaft, connections therebetween and the upper end of the lever, and means on the rod adapted to be acted upon by said collar to move the rod lengthwise in the hollow shaft to expand the clutch when the lever is moved in one direction, substantially as described.

6. In combination, a hollow shaft, a support therefor, a clutch head detachably mounted at one end of the hollow shaft, means to drive the shaft, a second shaft mounted below the hollow shaft, gearing connections between the shafts for driving the lower shaft at a comparatively low rate of speed, movable clutch members mounted in the clutch head, pins extending inwardly radially from said members, a rod extending through the hollow shalft, a tapered head on the end of the rod adjacent the pins, means operated by the lower shaft for moving the rod lengthwise of the hollow shaft to bring the tapered head against the pins with each revolution of the lower shaft followed by a release of the rod after an interval of time, a slide located below the clutch, means to operate the slide back and forth once with each revolution of the lower shaft, a cutting tool carried by the slide, an alining ring located around the clutch head, a spring forcing said ring over the head, and means connected to the ring and operated by the slide for forcing the ring against the action of the spring when the slide moves in one direction and releasing the said means when the slide moves in the opposite direction, substantially as described.

7. In combination, an expanding clutch adapted to receive and hold a ring, a slide mounted below the clutch, means to move the slide back and forth, an alining ring positioned around the clutch, a spring normally forcing the ring over the head of the clutch, a lever pivotally mounted between its ends between the alining ring and slide, connections between the lever and alining ring, a member having a pointed end pivotally connected to the slide and a similar member secured to the lever adapted to coact therewith as the slide moves in one direction to force the alining ring away from the clutch against the spring.

8. In combination, a support, a ram having a head adapted to detachably receive a ring mounted on the support, a ring receiving hopper having an open end in substantially the same vertical plane as the head, a support for the hopper, a shaft mounted on the support, a drum mounted below the ram, means to rotate the drum, means on the drum for reciprocating the drum through substantially one half of the rotation of the drum and leaving it at rest during the remainder of the revolution, a lever secured to the shaft, a bar interposed between the end of the drum and the lever, means on the end of the drum for reciprocating the bar to rock the shaft during that part of the revolution of the drum when the ram is at rest, a second lever at the opposite end of the shaft, a bar having a fork at its end located in front of the open end of the hopper, connections between said bar and the second lever for moving it back and forth across the end of the hopper to thereby carry the fork to the head of the ram, a block in the hopper, and means on the ram for moving the block toward said fork with each reciprocation of the ram, to move rings located between the block and fork into engagement with the fork, substantially as described.

9. In combination, a ring receiving hopper, a support therefor on which it is adjustably mounted, a bar having a notched upper edge slidably mounted in the lower part of the hopper, a block loosely mounted in the hopper, a pawl on the block engaging with the notches of the bar, a spring connected to the bar normally holding it in one position, a projection on the bar extending through the hopper, a ram mounted for sliding movements, means to move the ram back and forth, a member adjustably mounted on the ram and extending back of the projection on the bar, and an adjusting screw on said member adapted to contact with the projection and move the bar against the spring during the latter part of the movement of the ram in one direction, substantially as described.

10. An automatic machine for handling ring castings including mechanism for holding a ring, means for transferring rings one at a time to said holding mechanism from a quantity of rings, means for machining said ring while held on the holding means, and means for ejecting the ring from the holding means after completion of the operation on the ring, substantially as described.

11. An automatic machine for handling ring castings including a device for holding a single ring, means for carrying a quantity of rings, means for transferring one ring at a time from the ring carrying means to said device, means for machining a ring while on the device, means for ejecting the ring from said device after completion of the operation thereon, and means to move the quantity of rings in the holding means therefor step by step with each ring taken therefrom into position for action by the transfer means.

12. An automatic machine for handling ring castings including a movable member for holding a single ring, a hopper located adjacent one position of said movable member for containing a quantity of rings, selected means adapted to pass across one end of the hopper to take a ring therefrom and put it on said member, means for moving the member to another position and transferring it to a holding device, means operated simultaneously with the movement of said member to carry the quantity of rings in the hopper into position for the next operation of ring selecting means, means to machine the ring while held on the device and means to eject the ring from said device after its machining has been completed.

13. An automatic machine for handling ring castings including means for holding a quantity of rings combined with means for selecting one ring at a time therefrom and transferring it to a holding device, means for machining said ring while on the device and means for ejecting the ring from the holding device immediately before the succeeding ring is brought to said device.

In testimony whereof I affix my signature.

CHARLES E. JOHNSON.